United States Patent
Lee et al.

(10) Patent No.: US 7,885,871 B2
(45) Date of Patent: Feb. 8, 2011

(54) METHOD AND SYSTEM FOR MANAGING DRM AGENT IN USER DOMAIN IN DIGITAL RIGHTS MANAGEMENT

(75) Inventors: Seung-Jae Lee, Seoul (KR); Te-Hyun Kim, Seoul (KR); Youn-Sung Chu, Seoul (KR); Kiran Kumar Keshavamurthy, Seoul (KR)

(73) Assignee: LG Electronics Inc., Seoul (KR)

(*) Notice: Subject to any disclaimer, the term of this patent is extended or adjusted under 35 U.S.C. 154(b) by 294 days.

(21) Appl. No.: 11/771,700

(22) Filed: Jun. 29, 2007

(65) Prior Publication Data

US 2008/0126248 A1    May 29, 2008

(30) Foreign Application Priority Data

Jun. 29, 2006    (KR) ................ 10-2006-0059978

(51) Int. Cl.
G06Q 40/00    (2006.01)

(52) U.S. Cl. ................. 705/35; 705/36; 705/37; 705/39; 705/44

(58) Field of Classification Search ........... 705/35–45; 707/1–6, 100–104; 726/1–21
See application file for complete search history.

(56) References Cited

U.S. PATENT DOCUMENTS

| | | | | |
|---|---|---|---|---|
| 2002/0157002 A1* | 10/2002 | Messerges et al. | ........... | 713/155 |
| 2004/0103312 A1* | 5/2004 | Messerges et al. | ........... | 713/201 |
| 2005/0086514 A1* | 4/2005 | Han et al. | ........... | 713/200 |
| 2005/0182727 A1* | 8/2005 | Robert et al. | ........... | 705/51 |
| 2006/0177066 A1* | 8/2006 | Han et al. | ........... | 380/277 |
| 2007/0278290 A1* | 12/2007 | Messerges et al. | ........... | 235/380 |
| 2008/0046758 A1* | 2/2008 | Cha et al. | ........... | 713/189 |

FOREIGN PATENT DOCUMENTS

| | | |
|---|---|---|
| KR | 10-2005-0032856 B1 | 11/2005 |
| KR | 10-2006-0090136 A | 8/2006 |

OTHER PUBLICATIONS

"Apparatus and Method for Reporting State of Digital Right Management", Sai Ryorin, Cho Jung-Yon, Sohn Young-Chul, SamSung Electronics Co LTD, Published: Sep. 15, 2005.*
Jini Architectural Overview, Technical White Paper, Sun Microsystems, Inc., 1999, pp. 1-25.

* cited by examiner

Primary Examiner—Ella Colbert
Assistant Examiner—Hai Tran
(74) Attorney, Agent, or Firm—Birch, Stewart, Kolasch & Birch, LLP

(57) ABSTRACT

A method and system for managing at least one DRM agent intending to join or leave a user domain in a Digital Rights Management (DRM) is provided, in which a Domain Enforcement Agent (DEA) manages the joining and leaving of the DRM agent resident in a home network it manages, and a Domain Authority (DA) provides a domain key to a DRM agent joining the user domain.

11 Claims, 4 Drawing Sheets

METHOD AND SYSTEM FOR MANAGING DRM AGENT IN USER DOMAIN IN DIGITAL RIGHTS MANAGEMENT

TECHNICAL FIELD

The present invention relates to a Digital Rights Management (DRM), and more particularly, to a method and system for managing at least one DRM agent which joins or leaves a user domain.

BACKGROUND ART

A Digital Rights Management (DRM) refers to a system technology for safely protecting rights for digital contents and systematically managing them. The DRM provides a protecting and managing scheme for preventing the illegal copy of a content, acquiring DRM contents RO, and contents generating, contents transferring and contents processing.

FIG. 1 illustrates a construction of a DRM system. The DRM system controls content issued to a user by a content provider to be used only in a right-limit of RO. Here, the content provider refers to an entity corresponding to a Content Issuer (CI) and/or a Rights Issuer (RI).

The CI issues a protected content using a particular encryption key so as to protect the content from users having no access right therefor, while the RI issues RO required to use the protected content.

A DRM agent is mounted in a device (or terminal) thus to receive the protected content and its RO. The DRM agent then analyzes 'permission' (license) included in the RO and thus changes the protected content into a usable format in the corresponding terminal, thereby controlling the use of the content.

On the other hand, the DRM technology proposes a method by which a specific group of devices (terminals) which is so-called user domain can only use digital contents (i.e., DRM contents).

Here, the user domain (or domain) denotes a collection of user devices. Devices belonging (subscribed or joined) to the user domain denote domain members, each of which shares a common domain key. The domain key is used to decode a domain Rights Object (so-called domain RO). The domain RO is a type of RO shared by devices within the domain.

However, in the user domain related DRM technology, nothing has been provided to solve a technical problem as to how to manage specific devices which intend to join or leave the user domain, namely, DRM agents mounted in the devices. In addition, in view of the user domain management, it is required to solve a problem as to how to provide domain keys to specific DRM agents subscribed (joined) to the user domain in the DRM system.

DISCLOSURE OF THE INVENTION

Therefore, it is an aspect of the present invention to provide a method and system for managing at least one DRM agent joining or leaving a domain or a user domain.

To achieve this aspect, there is provided a method for managing DRM agents according to the present invention comprising: sending, by at least one DRM agent, a first message to a first entity and receiving a second message from the first entity; and accessing, by the DRM agent, a second entity using the second message and joining or leaving a user domain.

In another aspect of the present invention, there is provided a method for managing DRM agents comprising: receiving, by at least one DRM agent, a first message indicating to leave a user domain from a Domain Enforcement Agent (DEA); accessing, by the DRM agent, a Domain Authority (DA), which manages the user domain, using the first message; and leaving, by the DRM agent, the user domain.

In another aspect of the present invention, there is provided a method for DRM agents in which a first entity receives first information from a second entity and forwards the first information to at least one DRM agent that intends to join or leave a user domain.

In an aspect of the present invention, there is provided a system for managing DRM agents comprising: a DRM agent which intends to join or leave a user domain; a DEA which discovers the DRM agent and provides specific information to the DRM agent; and a DA which provides a specific domain key to the DRM agent when the DRM agent accesses the DA using the specific information.

MODES FOR CARRYING OUT THE PREFERRED EMBODIMENTS

Hereinafter, configurations and operations of exemplary embodiments of the present invention will be described with reference to the accompanying drawings.

The present invention relates to the management of at least one DRM agent, which joins or leaves a user domain by allocating separate functions to a Domain Enforcement Agent (DEA) and a Domain Authority (DA). In other words, the DEA of the present invention functions as a conduit such that it can discover the joining or leaving of devices resident in a home network managed by itself and allow the devices to join or leave a user domain managed by the DA, while the DA provides a domain key to devices joined in the user domain.

Figure 1:
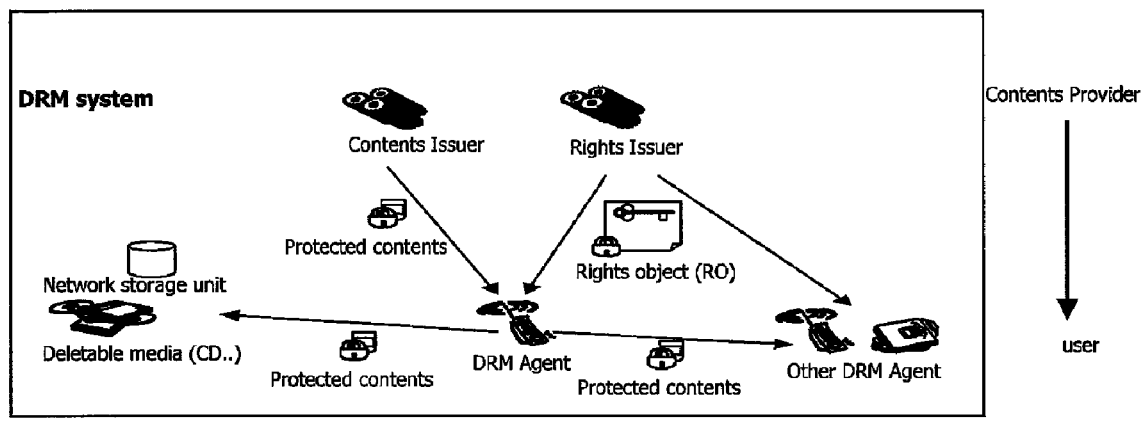
FIG. 1 is a view illustrating an exemplary configuration of a digital rights management (DRM) system.
Figure 2:
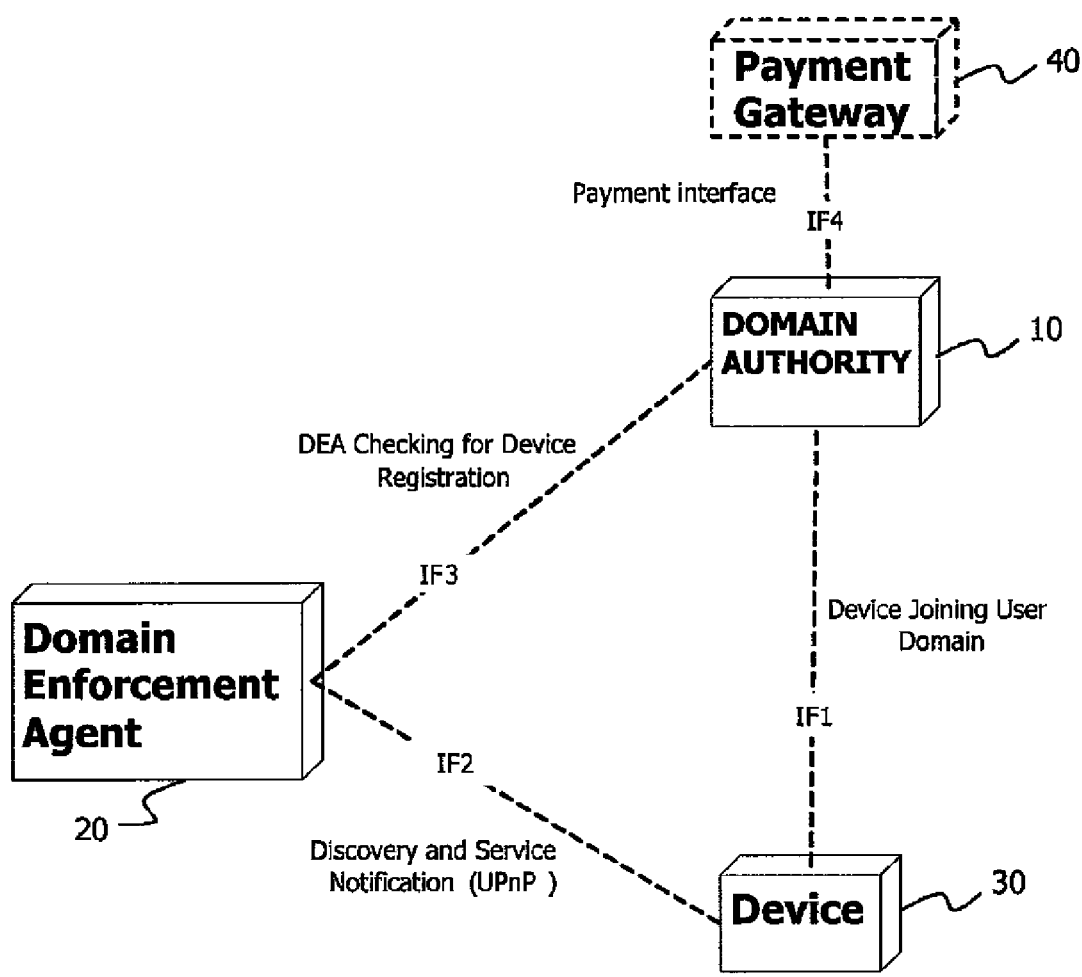
FIG. 2 is a block diagram schematically illustrating a DRM system in accordance with one embodiment of the present invention.

FIG. 2 is a block diagram schematically illustrating an exemplary DRM system in accordance with one embodiment of the present invention.

As illustrated in FIG. 2, a DRM system according to the present invention may comprise a DA 10, a DEA 20 and at least one DRM agent 30. Here, only one DRM agent 30 is provided in FIG. 2 for the sake of explanation. Also, the DRM system according to the present invention may further optionally comprise a payment gateway 40.

Hereinafter, functions and operations of the components will be described.

First, the DA 10 provides a domain key to at least one DRM agent joining a user domain. The DA 10 performs a ROAP protocol with the DRM agent 30 joining (subscribing to) the user domain so as to check the authentication of the DRM agent 30, the certificate of the DRM agent 30 and the revocation of the certificate. The DA 10 may also provide the latest CRL to the DRM agent 30 to check whether the DRM agent 30 has been authenticated by the DEA 20.

Second, the DEA 20 is a local entity resident in a home network (or a user domain). The DEA 20 manages DRM agents 30 joining and leaving the home network by using a home network function (e.g., proximity management systems). Also, the DEA 20 registers in the DA 10 prior to managing the DRM agent 30 of the home network. Upon registering in the DA 10, the DEA 20 receives URLs (Uniform Resource Locators) (e.g., service URLs) from the DA 10. Here, the service URL corresponds to the URL of the DA 10. As such, when a certain DRM agent 30 is registered in the user domain (i.e., when the DRM agent 30 joins or leaves the user domain), the DEA 20 serves as a conduit between the DA 10 and the DRM agent 30.

Third, the DRM agent 30 denotes an agent mounted in a DRM-applicable device (i.e., DRM enable device). That is, the DRM agent 30 is an agent which can be mounted in digital TVs, GPS navigation, portable game machines, MP3 and other home appliances as well as DRM-applicable mobile communications terminals (e.g., user equipment (UE), mobile phones, cellular phones, DMB phones, DVB-H phones, PDA phones, PTT phones, etc.). Accordingly, the DRM agent 30 may be mounted in any device by which DRM contents can be used.

Fourth, the payment gateway 40 is connected to the DRM agent 30 directly or via the DA 10 thus to perform payment generated after the DRM agent 30 joins the user domain.

Hereinafter, the operations among the components, namely, among the DA 10, the DEA 20 and the DRM agent 30 will briefly be described.

When a new DRM agent 30 enters a home network (i.e. a user domain) managed by the DEA 20, the DEA 20 checks domain policies. That is, if the DEA 20 can afford to allow the DRM agent 30 to join the user domain of its home network (i.e., if the maximum number of devices which can join the user domain does not reach based upon the domain policies, the DEA 20 allows the new DRM agent 30 to join the user domain. This operation (i.e., the joining of the new DRM agent 30 in the user domain) may be performed, for example, using an UpnP-based service registration.

The DEA 20 forwards the URL of the DA 10 received from the DA 10 to the DRM agent 30. The DEA 20 also provides particular cryptographic binding information related to itself to the DRM agent 30 resident in the home network. The DRM agent 30 subscribes in the user domain using the cryptographic binding information, and then is connected to the DA 10 using the URL of the DA 10 so as to receive a domain key from the DA 20. Here, the domain key corresponds to an access authority for using a domain Rights Object (RO). Detailed description thereof has been disclosed in OMA-DRM related documents, thus to be omitted for the sake of brief explanation of the present invention.

Hereinafter, interfaces among the components, namely, the DA 10, the DEA 20, the DRM agent 30 and the payment gateway 40 will be described with reference to FIG. 2.

First, an interface, for example, represented by 'IF1' in FIG. 2 exists between the DRM agent 30 and the DA 10 for their interaction. The interface IF1 may be performed by the ROAP protocol which is the DRM technology according to the related art. If a device having the DRM agent 30 is an unconnected device, the interface IF1 may be formed via the DEA 20, for example, at DLNA or UpnP home network solution.

Second, an interface represented by 'IF2' in FIG. 2 exists between the DEA 20 and the DRM agent 30 for their interaction. The interface IF2 is a protocol for allowing the DEA 20 to discover a new DRM agent 30 entering its home network. The interface IF2 may be UpnP, for example.

Third, an interface represented by 'IF3' in FIG. 2 exists between the DEA 20 and the DA 10 for their interaction. Here, the DEA 20 verifies whether there is any device (i.e., a DRM agent 30) as a member of the user domain. This verification is performed per every life time of the DRM agent 30, namely, per a period in which the DRM agent 30 is able to join the user domain. The interface IF3 may be performed by an extending ROAP protocol.

Fourth, an interface represented by 'IF4' of FIG. 2 exists between the DA 10 and the payment gateway 40 for their interaction. The interface IF4 may be applied either for a direct connection between the DRM agent 30 and the payment gateway 40 or for a connection between the DRM agent 30 and the payment gateway 40 via the DA 10.

Figure 3:
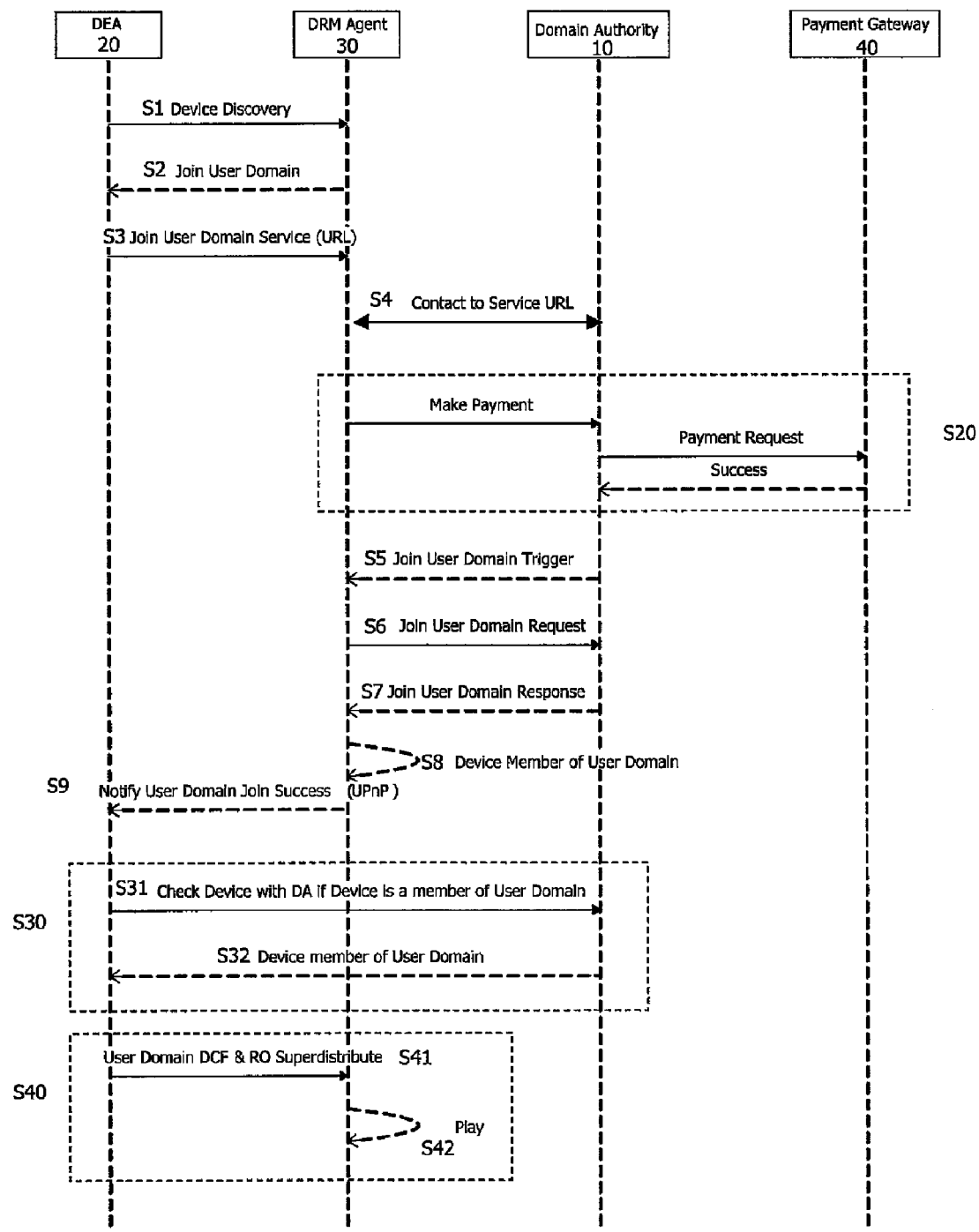
FIG. 3 is a signal flowchart illustrating an exemplary method for managing DRM agents in a user domain in accordance with another embodiment of the present invention.

FIG. 3 is a signal flowchart illustrating an exemplary method for managing DRM agents in a user domain in accordance with another embodiment of the present invention, particularly, illustrating an example in which a DRM agent joins a user domain.

Hereinafter, a series of steps S1 to S9 of managing a DRM agent 30 newly joining a user domain will be described with reference to FIG. 3.

When a new DRM agent 30 enters (accesses, is connected to, contacts to) a home network (i.e. a user domain) managed by the DEA 20, the DEA 20 searches or discovers the new DRM agent 30 (i.e., performs device discovery) (S1). A user of the DRM agent 30 sends the DEA 20 a message (i.e., Join User Domain) indicating that he intends to join the user domain of the home network (S2). After the step S2, the DEA 20 checks domain policies. If the DEA 20 can afford to allow the registration of the new device (i.e., the new DRM agent 30) according to the checked domain policies, the DEA 20 sends a Join User Domain Service message to the DRM agent 30 using a particular protocol (e.g., UpnP) (S3). Here, the DEA 20 forwards the URL (e.g., service URL) of the DA 10 received from the DA 10 to the device 30. The DEA 20 also sends the DRM agent 30 cryptographic binding information related to the DEA 20 (e.g., the ID of the DEA 20, the signature of the DEA 20, the ID of the user domain, etc.).

The DRM agent 30 tries to contact to (access) the DA 10 using the URL (i.e. the service URL) of the DA 10 (i.e., Contact to Service URL) (S4). For example, the step S4 may correspond to an HTTP GET request and a web-page access.

The DA 10 sends a Join User Domain Trigger message to the DRM agent 30 (S5). In response to the Join User Domain Trigger message, the DRM agent 30 sends a Join User Domain Request message to the DA 10 (S6). Here, the Join User Domain Request message may include cryptographic binding information in a format of a certain parameter. The cryptographic binding information may include authentication information forwarded to the DRM agent 30 by the DEA 20. In more detail, the Join User Domain Request message may include at least cryptographic parameters, namely, a DEA ID, a device (DRM agent) ID, a user domain ID and a DEA signature. Here, the DRM agent ID may be optional.

In response to the Join User Domain Request message, the DA 10 sends a Join User Domain Response message to the DRM agent 30, thus to inform the DRM agent 30 of the successful joining in the user domain (S7). Here, the DA 10 may forward a domain key for using a domain RO and user domain related parameters to the DRM agent 30 in the Join User Domain Response message.

The DRM agent 30 stores the user domain related parameters forwarded at the step S7 in a particular memory, and then becomes a member of the user domain (i.e., Device Member of User Domain) (S8). The DRM agent 30 then notifies the DEA 20, for example, via UpnP that it has successfully joined the user domain (i.e. Notify User Domain Join Success (UpnP) (S9).

As described in the steps S1 to S9, the DEA 20 discovers the new DRM agent 30 at the home network it manages, thus to provide the address of the DA 10, for example, URL thereof, to the DRM agent 30 for the connection to the DA 10. The DA 10 provides the domain key to the device 30 connected to the DA 10 via the URL of the DA 10.

Hereinafter, in addition to the steps S1 to S9, other functions and operations of the DEA 20 will be described in steps S30 and S40.

The DEA 20 can optionally provide or distribute the newly joined device 30 as the member of the user domain with a DRM content (i.e., data contents format (DCF) and a domain RO) (S41). Therefore, the DRM agent 30 can decode the domain RO using the domain key received from the DA 10 thus to replay the DRM content using the decoded domain RO (S42).

The DEA 20 checks to the DA 10 as to whether the DRM agent 30 is a member of the user domain (S31). The DA 10 may notify the DEA 20 that the DRM agent 30 is the member of the user domain (S32).

Also, in addition to the steps S1 to S9, as illustrated in FIG. 3, the present invention may optionally provide the payment gateway 40 to perform a payment process (S20).

Hereinafter, the payment process (S20) according to the present invention will be described.

If the DRM agent 30 which is joined or subscribed to a user domain after accessing DA 10, desires to perform a payment (i.e., "Make Payment" in FIG. 3), the DA 10 sends a detailed payment statement for the joining in the user domain to the DRM agent 30 or directly contact the device 30 to a payment portal. The DA 10 may perform a payment request to the payment gateway 40 or the user of the device 30 may perform the payment request to the payment gateway 40, instead of doing via the DA 10. For the payment request, after completely performing the payment, the payment gateway 40 sends a payment success message (i.e., Success) to the DA 10.

Figure 4:
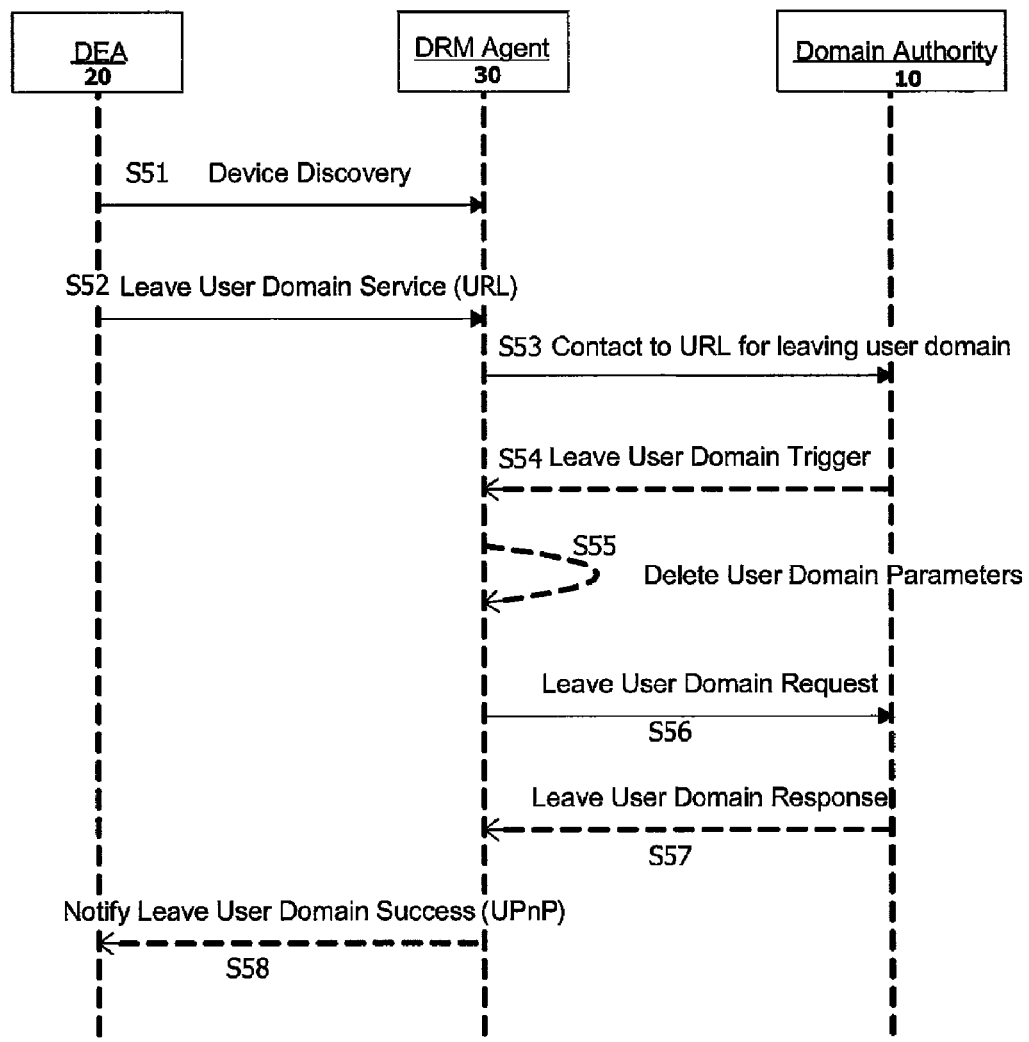
FIG. 4 is a signal flowchart illustrating an exemplary method for managing DRM agents in a user domain in accordance with still another embodiment of the present invention.

FIG. 4 is a signal flowchart illustrating a method for managing DRM agents in a user domain in accordance with still another embodiment of the present invention. Particularly, in the embodiment of FIG. 4, in case where the DEA 20 determines to exclude the DRM agent 30 resident in its home network from the user domain (i.e., in case of a forcible leaving of the DRM agent by the DA or voluntary leaving of the DRM agent), the DEA 20 performs this. Here, the exclusion may include a case where the DRM agent 30 voluntarily leaves the user domain and a case where the DEA 20 forces the DRM agent 30 to leave the user domain.

Referring to FIG. 4, when the DEA 20 discovers a DRM agent 30 at the home network to be removed from the user domain (S51), the DEA 20 sends a Leave User Domain Service (UpnP Service URL) message to the DRM agent 30 (S52). Here, the DEA 20 provides the DRM agent 30 with the URL of the DA 10 (e.g., an UpnP-based service URL) such that the DRM agent 30 can contact the DA 10.

The DRM agent 30 contacts to the DA 10 using the URL of the DA 10 provided at the step S52. Here, the DRM agent 30 may not have an option to leave the user domain.

The DA 10 sends a Leave User Domain Trigger message to the DRM agent 30 (S54). After receiving the Leave User Domain Trigger message, the DRM agent 30 deletes user domain related parameters (i.e., domain context required to use domain contents. Here, the domain context may include a domain ID, a domain key, a domain valid period, a maximum number of allowable member terminals, and the like) (S55).

The DRM agent 30 then sends a Leave User Domain Request message to the DA 10 (S56). In response to the message, the DA 10 removes the DRM agent 30 from the user domain, and sends a Leave User Domain Response message to the DRM agent (S57).

The DRM agent 30 notifies the DEA 20 that it has successfully left the user domain (i.e., Notify Leave User Domain Success (UpnP) (S58).

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

EFFECT OF THE INVENTION

As described above, the DEA of the present invention manages the joining and leaving of DRM agents resident in the home network managed by itself and the DA of the present invention distributes a domain key to each DRM agent joining the user domain.

Therefore, upon implementing the DEA of the present invention as hardware and as software, the DEA can be implemented more simply.

Also, the DA can flexibly manage the user domain according to the intention of the DRM agent user. That is, the DA can flexibly manage the user domain by excluding a particular DRM agent from the user domain (i.e., forcing the DRM agent to leave the user domain) or adding (i.e., joining) a certain DRM agent to the user domain according to the intention of the DRM agent user.

In addition, the DA can strictly manage the user domain regardless of the intention of the DRM agent user. That is, the DRM agent user cannot force DRM agents to leave the user domain according to his intention. Instead of this, a DRM agent can leave the user domain depending on user domain policies newly issued by the DA or changed user domain policies.

Furthermore, the present invention can allow the DA to strictly control the home network, malicious devices can be tracked and DRM agents of those devices can effectively be removed from the home network.

The invention claimed is:

1. A method of digital rights management (DRM), comprising:
   performing, by a first network server serving as a Domain Enforcement Agent (DEA) of a home network, a registration procedure into a second network server serving as a Domain Authority (DA) for providing a domain key to a device to join a user domain,
   wherein, during the registration procedure, the first network server serving the DEA receives from the second network server serving as the DA information including a URL of the second network server serving as the DA;
   performing, by the first network server serving as the DEA, a device discovery procedure in order to detect whether said device has to join or leave the user domain of the home network;
   checking, by the first network server serving as the DEA, one or more domain policies related to said device to determine whether registration or de-registration of said device is to be performed;

sending, by the first network server serving as the DEA, a Join User Domain Service message to said device by using a UPnP (Universal Plug and Play) protocol, if registration of said device is to be performed as a result of the checking step, wherein the Join User Domain Service message further includes a URL of the second network server serving as the DA and cryptographic binding information related to the first network server serving as the DEA, such that said device uses the URL to contact the second network server serving as the DA and uses the cryptographic binding information to join the user domain, and wherein the cryptographic binding information comprises an identifier of the first network server serving as the DEA, a signature of the first network server serving as the DEA, and an identifier of the user domain;

sending, by the first network server serving as the DEA, a Leave User Domain Service message to said device by using the UPnP (Universal Plug and Play) protocol, if de-registration of said device is to be performed as a result of the checking step, wherein the Leave User Domain Service message includes the URL of the second network server serving as the DA such that said device uses the URL to contact the second network server serving as the DA to leave the user domain; and receiving, by the first network server serving as the DEA, notification from said device that joining or leaving the user domain was successful as a result of said device interacting with the second network server serving as the DA.

2. The method of claim 1, wherein the domain policies are related to a total maximum number of devices that can be supported by the user domain.

3. The method of claim 1, further comprising:
registering, by the first network server serving as the DEA, with the second network server serving as the DA before receiving the URL of the second network server serving as the DA.

4. The method of claim 1, further comprising:
exchanging, by the first network server serving as the DEA, messages with the second network server serving as the DA to confirm that said device has become a member of the user domain; and
providing, by the first network server serving as the DEA to said device, DRM content that includes a data contents format (DCF) and a domain rights object (RO).

5. A method of digital rights management (DRM), comprising:
performing, by a device having a unit serving as a DRM agent, a device discovery procedure provided by a first network server serving as a Domain Enforcement Agent (DEA) of a home network such that said device executes either a device joining procedure or a device leaving procedure with respect to a user domain of the home network, wherein the device joining procedure includes four sequential steps including:
sending, by the unit serving as the DRM agent of said device, a Join User Domain message to the first network server serving as the DEA of the home network that detects whether a device should join the user domain of the home network,
receiving, by the unit serving as the DRM agent of said device in response to the sent Join User Domain message, a Join User Domain Service message from the first network server serving as the DEA of the home network that checked one or more domain policies related to said device to determine whether registration of said device is to be performed, wherein the Join User Domain Service message includes a URL of a second network server serving as a Domain Authority (DA) for providing a domain key for joining a user domain and cryptographic binding information related to the first network server serving as the DEA such that the unit serving as the DRM agent of said device uses the URL to contact the second network server serving as the DA to join the user domain, and wherein the cryptographic binding information comprises an identifier of the first network server serving as the DEA, a signature of the first network server serving as the DEA, and an identifier of the user domain, interacting, by the unit serving as the DRM agent of said device, with the second network server serving as the DA, based on the received URL of the second network server serving as the DA and the cryptographic binding information related to the first network server serving as the DEA, using of a HTTP GET request message and performing web-page access, and sending, from the unit serving as the DRM agent of said device to the first network server serving as the DEA, a notification that joining the user domain was successful as a result of interacting with the second network server serving as the DA, and wherein the device leaving procedure includes four sequential steps including:
sending a Leave User Domain message to the first network server serving as the DEA of the home network that detects whether a device has to leave the user domain of the home network,
receiving a Leave User Domain Service message from the first network server serving as the DEA of the home network that checked one or more domain policies related to said device to determine whether de-registration of said device is to be performed, wherein the Leave User Domain Service message includes the URL of the second network server serving as the DA such that the unit serving as the DRM agent of said device uses the URL to contact the second network server serving as the DA to leave the user domain, interacting with the second network server serving as the DA, using the received URL of the second network server serving as the DA, resulting in deletion of user domain parameters for said device, and sending, to the first network server serving as the DEA, a notification that leaving the user domain was successful as a result of interacting with the second network server serving as the DA.

6. The method of claim 5, wherein the domain policies are related to a total maximum number of devices that can be supported by the user domain.

7. The method of claim 5, wherein, in the device joining procedure, the interacting step further comprises:
receiving, from the second network server serving as the DA, a Join User Domain trigger message;
sending, to the second network server serving as the DA, a Join User Domain Request message; and
receiving, from the second network server serving as the DA, a Join User Domain Response message.

8. The method of claim 5, wherein, in the device leaving procedure, the interacting step further comprises:

sending, to the second network server serving as the DA, a URL contact message for leaving the user domain;

receiving, from the second network server serving as the DA, a Leave User Domain Trigger message;

deleting user domain parameters;

sending, to the second network server serving as the DA, a Leave User Domain Request message; and receiving, from the second network server serving as the DA, a Leave User Domain Response message.

9. An apparatus supporting digital rights management (DRM), the apparatus comprising:

a transceiver that transmits and receives signals and information with a home network;

a unit that serves as a DRM agent that cooperates with a first network server serving as a Domain Enforcement Agent (DEA) of the home network and that cooperates with a second network server serving as a Domain Authority (DA) of the home network, wherein the first network server serving as the DEA checks one or more domain policies related to said device to determine whether registration or de-registration of said device is to be performed, and the unit serving as the DRM agent receives a domain key from the second network server serving as the DA via said transceiver after joining a user domain of the home network;

a first interface (IF1) that allows the unit serving as the DRM agent to access the second network server serving as the DA via said transceiver; and a second interface (IF2) that allows the unit serving as the DRM agent to access the first network server serving as the DEA via said transceiver, wherein the device joining procedure includes:
  performing a device discovery procedure by the first network server serving as the DEA,
  receiving a Join User Domain Service message from the first network server serving as the DEA of the home network that checked one or more domain policies related to said device to determine whether registration of said device is to be performed,
  wherein the Join User Domain Service message includes a URL of the second network server serving as the DA and cryptographic binding information related to the first network server serving as the DEA such that the unit serving as the DRM agent of said device uses the URL to contact the second network server serving as the DA and uses the cryptographic binding information to join the user domain, the cryptographic binding information comprising an identifier of the first network server serving as the DEA, a signature of the first network server serving as the DEA, and an identifier of the user domain, and
  interacting is performed with the second network server serving as the DA, based on the received URL of the second network server serving as the DA and the cryptographic binding information related to the first network server serving as the DEA, using a HTTP GET request message and performing web-page access; and wherein the device leaving procedure includes:
  performing a device discovery procedure by the first network server serving as the DEA,
  receiving a Leave User Domain Service message from the first network server serving as the DEA of the home network that checked one or more domain policies related to said device to determine whether de-registration of said device is to be performed,
  wherein the Leave User Domain Service message includes the URL of the second network server serving as the DA such that the unit serving as the DRM agent of said device uses the URL to contact the second network server serving as the DA to leave the user domain, and
  interacting is performed with the second network server serving as the DA, using the received URL of the second network server serving as the DA, resulting in deletion of user domain parameters for said device.

10. The apparatus of claim 9, wherein the domain policies are related to a total maximum number of devices that can be supported by the user domain.

11. The apparatus of claim 9, wherein the transceiver, the unit serving as the DRM agent, the first interface and the second interface are implemented as part of an electronic device comprising at least one of a digital television, a GPS navigation device, a portable game machine, an MP3 player, a home appliance, a mobile communication terminal, a user equipment (UE), a mobile phone, a cellular phone, a DMB phone, a DVB-H phone, a personal digital assistant (PDA) phone, and a push-to-talk (PTT) phone.

* * * * *